Patented June 23, 1953

2,643,252

UNITED STATES PATENT OFFICE 2,643,252

3,8-BIS-(TRIFLUOROMETHYL)-BENZO(C) CINNOLINE AND N-OXIDES THEREOF

Sidney D. Ross, Williamstown, and Irving Kuntz, North Adams, Mass., assignors to Sprague Electric Company, North Adams, Mass., a corporation of Massachusetts No Drawing. Application September 25, 1951, Serial No. 248,276

4 Claims. (Cl. 260—250)

This invention relates to new and useful bis-(trifluoromethyl)-benzo (c) cinnoline compounds, and in particular to benzo (c) cinnoline compounds of this class used as stabilizers in various dielectric compositions.

An object of this invention is to produce a series of bis-(trifluoromethyl)-benzo (c) cinnoline compounds and mono and dioxide derivatives thereof useful as intermediates in chemical synthesis, as stabilizers in dielectric compositions, etc. This and further objects will be apparent from the following description and claims.

The invention is concerned with the fluorine substituted alkyl group derivatives of and

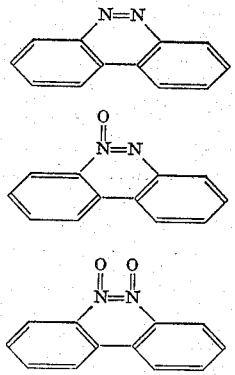

The bis-trifluoromethyl derivatives of these compounds are representative compounds of this type.

The preferred isomers are the 3-8 bis-trifluoromethyl derivatives of each of the above compounds.

Typical compounds of this invention are conveniently prepared by controlled reduction of 2,2'-dinitro-4,4'-bis-(trifluoromethyl)-biphenyl (II). This starting compound is in turn prepared by the condensation of 3-nitro-4-chloro-benzotrifluoride. Other nuclearly substituted benzo (c) cinnoline compounds besides the specific compound indicated may be used as a starting product in the production of the various related benzo (c) cinnoline compounds.

The invention is also concerned with the compound 2,2'-diamino-4,4'-bis-(trifluoromethyl) biphenyl, (I).

The preferred derivatives of the compounds which are prepared in accordance with this invention are, as noted above:

| 3,8-bis-(trifluoromethyl)-benzo(c)cinnoline | III |
| 3,8-bis-(trifluoromethyl)-benzo(c)cinnoline-5-oxide | IV |
| 3,8-bis-(trifluoromethyl)-benzo(c)cinnoline-5,6-dioxide | V |

Other fluoroalkyl compounds can be produced, e. g. mono $CF_3$ substituted compounds; —$C_2F_5$ substituted compounds, etc.

As indicative of a use for these various compounds, compounds III, IV and V indicated above may all be used in amounts from ½ of 1% to 10% in the various mineral oil or natural petroleum fraction dielectrics employed in the condenser industry, the halogenated aromatic wax and oil dielectrics, castor oil and other vegetable oils, and the liquid olefin polymers to improve the high temperature stability thereof in the presence of an electrical field.

The following table clearly indicates the importance of concentration of reducing agent as used in the reduction of the biphenyl compound II to produce any of the benzo-(c)-cinnoline compounds III, IV, or V:

| Moles $Na_2S$ (reducing agent) per Mole Nitro Group | Moles NaOH per Liter of Reaction Mixture | Reaction Time (hrs.) | Percent Yield of— | | | |
|---|---|---|---|---|---|---|
| | | | V | IV | III | I |
| 0.25 | 0.073 | 3 | 43.6 | 31.1 | ---- | ---- |
| 1.0 | 0.28 | 2 | ---- | [1]25 | [1]75 | ---- |
| 3.0 | 0.22 | 22 | ---- | ---- | 95 | 2.4 |

[1] On the basis of analytical data.

The preparation of these new compounds will best be understood with reference to the following examples, which are to be taken by way of illustration only and are not to be considered as limiting the invention in any respect:

EXAMPLE I 2,2'-Dinitro-4,4'-bis-(trifluoromethyl)-biphenyl, II.—3-Nitro-4-chlorobenzotrifluoride (451 g.; 2 moles; from Hooker Electrochemical Co.) was heated to 165° C. in a flask fitted with a stirrer, thermometer and reflux condenser. Copper powder (127 g.) was added cautiously over a fifteen minute period, and the reaction mixture was heated to reflux. After two hours, copper powder (31 g.) was added, and this addition was repeated twice again after the same time intervals. After 17 hours of reflux the reaction mixture was poured into water, and the aqueous mixture was extracted portionwise with benzene (1 liter). The combined benzene extracts were washed with 10% hydrochloric acid and water and dried over anhydrous magnesium sulfate. After removal of the solvent, the residue was distilled, with slight accompanying decomposition, at 1.5 mm. to give 130 g. of yellow product; B. P. 163–170° C. Recrystallization from ethanol yielded 112 g. (30%) of yellow needles; M. P. 124–125° C.

EXAMPLE II

*2,2' - Diamino - 4,4' - bis-(trifluoromethyl) -biphenyl, I.*—A mixture of II (8.5 g.; 0.022 mole) and concentrated hydrochloric acid (115 cc.; S. G. 1.18) was warmed to 50° C. Mossy tin (28 g.) and concentrated hydrochloric acid (46 cc.) were added over a one-half hour interval. After addition of sufficient ethanol to effect solution of the organic material, the reaction mixture was refluxed three hours. It was then poured into ice water and made basic to litmus with sodium hydroxide. The basic solution was extracted with benzene; the extract was washed and dried; the solvent was removed at reduced pressure and the residue was crystallized from ligroin (B. P. 90–100° C.) to give 4.6 g. (65%) of the diamine; colorless needles; M. P. 130–134° C. Recrystallization from ligroin raised the M. P. to 134–135° C.

*Anal.*—Calcd. for $C_{14}H_{10}N_2F_6$: C, 52.51; H, 3.15; N, 8.75. Found: C, 52.64, 52.78; H, 3.20, 3.09; N, 8.84, 8.73.

From the reaction of 0.1 g. of I, 2 cc. of pyridine and 2 cc. of acetic anhydride there was isolated, in the usual fashion, 0.08 g. (70%) of 2,2'-diacetamino - 4,4' - bis - (trifluoromethyl) - biphenyl; colorless needles; M. P. 162–165° C. from ligroin (B. P. 90–100° C.). Further recrystallization from ligroin raise the M. P. to 174–175° C.

*Anal.*—Calcd. for $C_{18}H_{14}N_2O_2F_6$: C, 53.47; H, 3.49; N, 6.93. Found: C, 53.70, 53.49; H, 3.46, 3.54; N, 6.95, 7.11.

EXAMPLE III

*Reduction of II with sodium sulfide.—Part A.*—1 mole $Na_2S$/mole $NO_2$—To a stirred solution of II (25 g.; 0.066 mole) in ethanol (500 cc.), which had been heated to 60° C., there was added a solution of sodium sulfide-nonahydrate (31.6 g.; 0.132 mole) and sodium hydroxide (6.3 g.) in water (55 cc.). The addition was made at a rate such that the temperature of the reaction mixture was maintained at 60–70° C. and required 45 minutes. After the reducing solution had been added, the reaction mixture was refluxed two hours, after which time ethanol (300 cc.) was removed by distillation. On pouring the dark residue into water a tan solid separated. This was filtered and crystallized from methanol to yield 18.8 g. of yellow crystals; M. P. 189–191° C. Further recrystallization gave bright yellow-green plates; M. P. 192–193° C. From analytical data (Found: C, 52.49, 52.61) we estimate that this product contains 75% III and 25% IV. The separation of such a mixture will be described in detail in connection with the catalytic hydrogenation study.

The above mixture of III and IV (9.9 g.) and ethanol (400 cc.) were added to a solution of stannous chloride-dehydrate (18 g.) in concentrated hydrochloric acid (150 cc.), and the mixture was refluxed three hours. After removal of the ethanol by distillation, the reaction mixture was poured into ice water, made basic to litmus with sodium hydroxide, and the yellow-brown solid which deposited was collected by suction filtration. Recrystallization from ethanol gave 7.7 g. of III; yellow-green plates; M. P. 192.5–193° C.

*Anal.*—Calcd. for $C_{14}H_6N_2F_6$: C, 53.21; H, 1.91. Found: C, 52.93, 53.14; H, 1.75, 1.83.

*Part B.*—0.25 mole $Na_2S$/mole $NO_2$—A mixture of II (5 g.) sodium sulfide-nonahydrate (1.58 g.) and sodium hydroxide (0.32 g. in 10 cc. water) in ethanol (100 cc.) was refluxed three hours. The crude product was isolated as in Part A above and crystallized from ethanol to yield 2,2'-dinitroso-4,4'-bis-(trifluoromethyl)-biphenyl, V. (2.0 g.; 43.6%). Recrystallization from dioxane gave colorless needles; M. P. 267 d. (into copper block at 220° C.; temperature rise 5° C. per minute). This product yellows before melting and gives, on recrystallization, yellow mother liquors, the color intensity of which increases with prolonged heating.

*Anal.*—Calcd. for $C_{14}H_6N_2O_2F_6$: C, 48.29; H, 1.74. Found: C, 48.02, 48.19; H, 1.87, 1.79.

*3,8 - bis-(trifluoromethyl) -benzo(c) cinnoline-5-oxide, IV,* (1.3 g; 31.1%), was obtained from the ethanolic liquors as colorless plates of M. P. 211–213° C. This material did not give a depression on mixed melting with IV obtained by the other methods described, and its ultraviolet absorption spectrum was superposable with those of other samples of this compound.

*Anal.*—Calcd. for $C_{14}H_6N_2OF_6$: C, 50.61; H, 1.82. Found: C, 50.33, 50.08; H, 1.72, 1.79.

*Part C.*—3.0 moles $Na_2S$/mole $NO_2$.—A mixture of II (5 g.), sodium sulfide-nonahydrate (18.7 g.) and sodium hydroxide (1.5 g. in 50 cc. water) in ethanol (120 cc.) was refluxed 20 hours. Isolation of the product in the usual fashion yielded 4.0 g. of III; M. P. 192.8–193.5° C. The ultraviolet spectrum of this sample was superposable with the spectra of those prepared by other methods described.

From the alcoholic mother liquors from the above product there was obtained 2,2'-diamino-4,4'-bis-(trifluoromethyl)-biphenyl, I; yield 0.1 g.—2.4%; M. P. 133–135° C.—no depression on mix-melting with an authentic sample of I.

EXAMPLE IV

*3,8 - bis-(trifluoromethyl) -benzo(c) cinnoline-5-oxide, IV.* A solution of III (1.79 g.; 0.0057 mole) in chloroform (20 cc.) was treated with peracetic acid (1.85 g. of a 40% solution of the peracid in acetic acid; obtained from the Becco Sales Corp.). After standing at room temperature for two days, during which time the reaction mixture was shaken occasionally, the chloroform solution was washed with 10% sodium hydroxide, then water and dried over anhydrous magnesium sulfate. Removal of the solvent gave IV; colorless solid; M. P. 208–210° C.; yield 1.71 g. (90%). Crystallization from ethanolbenzene gave colorless plates of M. P. 210.5–212° C.

*Anal.*—Calcd. for $C_{14}H_6N_2OF_6$: C, 50.61; H, 1.82. Found: C, 50.42, 50.58; H, 1.67, 1.49.

The ultraviolet spectrum of IV obtained in this manner was superposable on the spectra of samples obtained by the sodium sulfide reduction.

The benzo(c) cinnoline compound III can also be produced from the biphenyl I by the deamination of this compound, as noted below:

EXAMPLE V

*Deamination of 2,2' - diamino-4,4'-bis-(trifluoromethyl) -biphenyl, I.*—Concentrated hydrochloric acid (10 cc.) and water (45 cc.) were added to I (5 g.; 0.0156 mole) in a 500 cc. 3-necked-flask fitted with a stirrer, reflux condenser and thermometer, and the mixture was boiled for five minutes. The mixture was cooled to room temperature, concentrated hydrochloric acid (8 cc.) was added and the contents of the flask were cooled to 0° C. with an ice-salt mixture. A solution of 2.3 g. of 97% sodium nitrite in water (6 cc.) was then added over a 15 minute period while the temperature of the reaction mixture was maintained at 0–3° C. The diazonium solution was then stirred for one hour at the same temperature. 50% hypophosphorous acid (60.3 g.; 0.46 mole; precooled to 0° C.) was added to the yellow-orange diazonium solution over 15 minutes, and, after stirring at 0–3° C. for two hours, the deamination mixture was placed in an ice-chest 5–8° C. for 38 hours. Filtration of the yellow-brown solid, which separated during the reaction, and crystallization from ethanol gave 2.27 g. (46%) of yellow crystals of 2,8-bis-(trifluoromethyl)-benzo(c)cinnoline, III (M. P. 190–193° C.). Recrystallization from ethanol gave yellow plates (M. P. 191–192.8° C.).

*Anal.*—Calcd. for $C_{14}H_6N_2F_6$: C, 53.21; H, 1.91. Found: C, 53.26, 53.09; H, 1.72, 1.83.

EXAMPLE VI

*Catalytic hydrogenation of 2,2'-dinitro-4,4'-bis-(trifluoromethyl)-biphenyl, II.*—A solution of II (53.8 g.; 0.14 mole) in ethyl acetate (140 cc.) was shaken in a Parr low-pressure hydrogenation apparatus at 2–3 atmospheres hydrogen pressure with 0.1 g. platinum oxide catalyst (Baker and Co., Lot No. 7021) at room temperature. Initially hydrogen uptake was rapid, and the reaction bottle became warm. After 2.5 hours no further hydrogen uptake was observed. Addition of fresh catalyst and renewed shaking for several hours did not lead to any perceptible pressure drop. After filtration of the catalyst most of the ethyl acetate-water azeotrope was removed by distillation at atmospheric pressure. When the final traces of solvent were removed in vacuo the residue set to a solid yellow cake weighing 50 g. This crude product began to melt at 125°, was liquid at 140° but not completely clear until 175°.

The crude solid was suspended in refluxing absolute ethanol (200 cc.). The hot solution was rapidly filtered and the filtrate allowed to cool. It set to an almost solid mass on cooling. Filtration and crystallization from a smaller volume of ethanol gave 17 g. of yellow needles; M. P. 190–192°. This was shown to be a mixture of III and IV by chromatography. A 2 g. sample of the mixture was deposited on an alumina column (1.5 cm. x 50 cm.). Elution at 30–50 mm. of mercury pressure above atmospheric was carried out with varying concentrations of ethanol in hexane, initially 0.5%, then 1% and finally 20%. The benzo(c)cinnoline oxide, IV, was finally liberated from the column with absolute alcohol. The course of the separation was followed by determining the spectrum of each fraction eluted from the column. From the 2 g. sample we obtained 0.41 g. of III, M. P. 192–193°, 1.11 g. of mixtures III and IV at various stages of separation and 0.45 g. of IV, M. P. 201–204°. The 3,8-bis-(trifluoromethyl)benzo(c)cinnoline thus obtained was crystallized from ethanol; yellow-green plates; M. P. 192–193°.

*Anal.*—Calcd. for $C_{14}H_6N_2F_6$: C, 53.21; H, 1.91. Found: C, 53.01, 52.86; H, 1.96, 1.75.

Crystallization of the above 3,8-bis-(trifluoromethyl)-benzo(c)cinnoline-5-oxide from hexane-ethanol gave colorless plates; M. P. 211–212.5°.

*Anal.*—Calcd. for $C_{14}H_6N_2OF_6$: C, 50.61; H, 1.82. Found: C, 50.81, 50.65; H, 1.76, 1.82.

By comparison of the spectrum of the initial mixture of III and IV with the spectra of pure III and pure IV it was possible to estimate that this mixture contains 31±2% by weight of IV. Also treatment of this mixture with stannous chloride as in the case of the mixed product obtained by sodium sulfide reduction (see Example 3, Part A) converts this mixture into pure III.

What is claimed is:
1. 3,8-bis-(trifluoromethyl)-benzo(c)cinnoline.
2. 3,8-bis-(trifluoromethyl)-benzo(c)cinnoline-5-oxide.
3. 3,8-bis-(trifluoromethyl)-benzo(c)cinnoline-5,6-dioxide.
4. A compound conforming to the following general formula

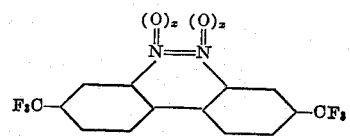

wherein $x$ is an integer selected from the group 0 and 1.

SIDNEY D. ROSS.
IRVING KUNTZ.

No references cited.